United States Patent [19]

Stagg et al.

[11] Patent Number: 4,861,642
[45] Date of Patent: Aug. 29, 1989

[54] REINFORCEMENT OF PHENOLIC FOAMS COMPOSITE

[75] Inventors: Malcolm J. Stagg, Beaconsfield; Eric P. Stern, Montreal; Sunil Vidyarthi, Beaconsfield, all of Canada

[73] Assignee: BPCO Inc., Canada

[21] Appl. No.: 165,748

[22] Filed: Mar. 9, 1988

[30] Foreign Application Priority Data

Mar. 13, 1987 [CA] Canada ................... 532004

[51] Int. Cl.$^4$ ............................................. B32B 3/26
[52] U.S. Cl. ...................................... 428/139; 156/79; 428/182; 428/184; 428/309.9; 428/317.5
[58] Field of Search ................ 156/79; 428/139, 159, 428/178, 182, 184, 186, 309.9, 317.5

[56] References Cited

U.S. PATENT DOCUMENTS

| | | | |
|---|---|---|---|
| 3,274,046 | 9/1966 | Shannon et al. | 428/86 |
| 3,467,569 | 9/1969 | Weber et al. | 428/317.7 |
| 3,637,459 | 1/1972 | Parish et al. | 428/317.1 |
| 4,091,142 | 5/1978 | Elmore et al. | 428/309.9 |
| 4,150,850 | 4/1979 | Doerfling | 428/309.9 |
| 4,358,498 | 11/1982 | Chavannes | 428/184 |
| 4,425,396 | 1/1984 | Hartman | 428/220 |
| 4,500,596 | 2/1985 | Lee | 428/317.5 |

*Primary Examiner*—William J. Van Balen
*Attorney, Agent, or Firm*—Silverman, Cass, Singer & Winburn, Ltd.

[57] ABSTRACT

A foam composite—especially useful as an insulating board—comprising first and second opposed corrugated skins having corrugations with inwardly facing apices, one or each of the skins being provided with a mat of porous or apertured reinforcement material extending across the apices of the corrugations and the foam extending through the pores or apertures of each mat to fill the spaces defined by the inwardly facing surfaces of the corrugations and embed the reinforcement material within the cured foam. As an alternative to a continuous mat, there may be used a plurality of strips of rigid porous or nonporous reinforcement material, spaced apart and extending across the apices of the corrugations, the foam extending through the gaps between the strips to fill the spaces defined by the inwardly facing surfaces of the corrugations and embed the strips of reinforcement material within the foam. The mat or strips reinforce the skin and resist dimensional change due to shrinkage of the foam core during storage.

27 Claims, 8 Drawing Sheets

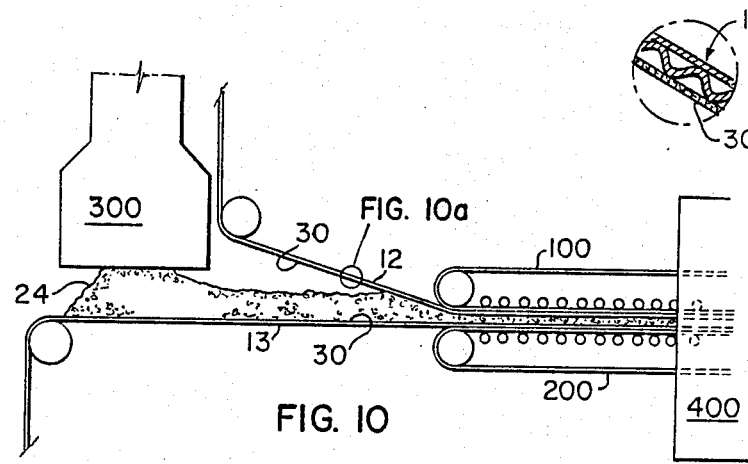
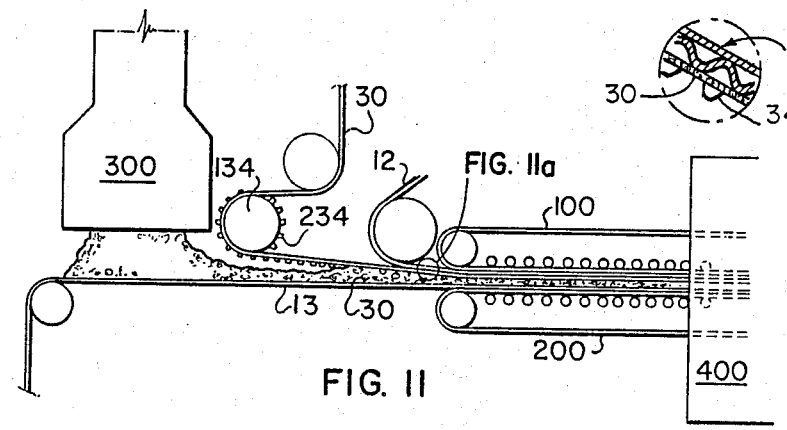
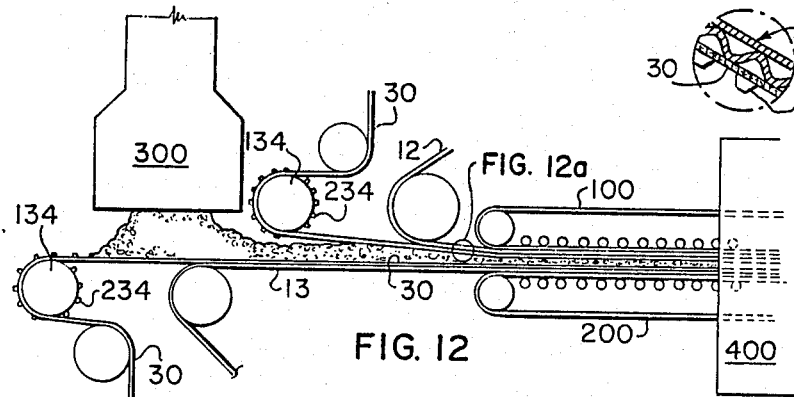
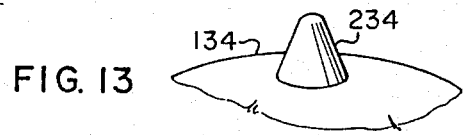
FIG. 13

REINFORCEMENT OF PHENOLIC FOAMS COMPOSITE

This invention relates to foam composites and specifically to a method of mechanically reinforcing same. In the case of closed cell phenolic foam composites, the invention is especially effective to reduce shrinkage during storage of such composites.

Considering the case of closed cell phenolic foams, some of these have an excessive tendency to shrink after manufacture. Even when these foams are incorporated into insulating boards by sandwiching the foam being corrugated kraft paper skins, shrinkage can occur.

The shrinkage at room temperature can be as much as 2% over periods as extensive as two months, before the panel achieves an equilibrium between the shrinkage forces of the foam and the restraining force of the kraft paper. Especially in the "machine direction" of the corrugated board manufacturing process—that is in the direction perpendicular to the corrugated kraft paper flutes—the kraft paper offers little resistance to shrinkage of the foam. Therefore, the shrinkage of the boards in the machine direction is significantly larger than in the "cross machine" direction (along the corrugated flutes).

It is one object of the present invention, therefore, to reinforce the skin of closed cell phenolic foam composite in order to resist shrinkage of the foam. It may be noted that one method of restraining shrinkage of the foam, in such a composite is to provide perforations in the kraft paper, through which the foam passes and effectively keys itself to the paper. However, the filling of the corrugated flutes with phenolic resin through the perforations happens in a random fashion and, as a result, the shrinkage values in the machine direction show a much larger variability than in the cross-machine direction.

A further object of the present invention is to provide a method of reinforcing foam composites in general—i.e. those composites having cores of closed cell or open cell phenolic foams, urethanes, isocyanurates, and the like—in order to increase the mechanical strength of such composites and provide increased resistance to bending and other deformations.

According to the present invention, we provide reinforcement of the kraft paper skin by locating a mat or strips of reinforcement material across the apices of the kraft paper corrugations on the side adjacent the foam. Where the reinforcement is in the form of a mat, it should be porous or perforated to permit the foam to pass therethrough. Especially suitable for this purpose is fibreglass, which is porous and inherently dimensionally stable with respect to hygrothermal stresses. The raising foam is forced during the manufacturing process through the pores of the mat or, additionally, through perforations made through the mat. The catalysed resin penetrating through such pores or perforations assures the bond between the consecutive layers of foam, mat and corrugated skin.

Especially where the mat is porous, the resin penetrating the pores of the mat forms a high density composite with the mat, providing a superior compression modulus entity, which, in the case of closed cell phenolic foam cored composites, is capable of resisting the shrinkage forces induced by the closed cell phenolic foam.

Where the reinforcement is in the form of strips, a variety of porous or non-porous materials may be used, such as steel strapping, fibreglass, Arborite (trade mark), cellulosic felt, gypsum paper and extruded polymer profile. The raising phenolic foam is forced during the manufacturing process around the reinforcing strips, sticking them to the corrugated paper by wrapping around or through the pores of the mat, and adhering to the paper.

The in-plane compression modulus of a closed cell phenolic foam composite board reinforced in accordance with the present invention is increased to such an extent that the forces of compression induced by the shrinking foam can be resisted with little deformation, and the shrinkage of the composite board is significantly reduced. We have found that accelerated curing at 180° F. for one hour of a typical composite board according to the invention, having a foam thickness of 1.5 inches, exhibits a reduction in shrinkage from almost 2% (for a conventional, non-reinforced board) to about 0.5% in the cross-machine direction, even using foam cores having normal shrinkage factors as high as 3.5%.

The invention will now be described further, by way of example only, with reference to the accompanying drawings, wherein:

FIG. 10 shows, in schematic form, part of a production line for manufacturing foam composites according to the invention;

FIG. 10a is an enlarged exploded view illustrating a portion of the protective skin shown in FIG. 10;

Figure 6:
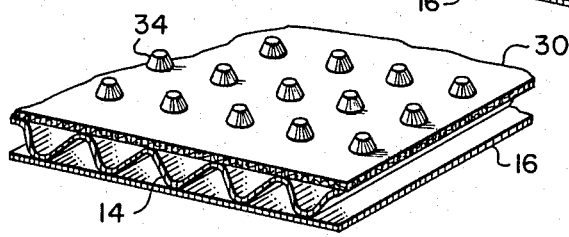
FIGS. 6, 7 and 8 illustrate further embodiments of the invention.

FIGS. 11 and 12 show, in schematic form, modified production lines specifically for manufacturing foam composites according to the embodiment of FIG. 6; and FIGS. 11a and 12a are enlarged exploded views showing portions of the respective protective skins shown in FIGS. 11 and 12; and FIG. 13 illustrates a punch configuration especially suited for use in the production line of FIG. 11.

Figure 1:
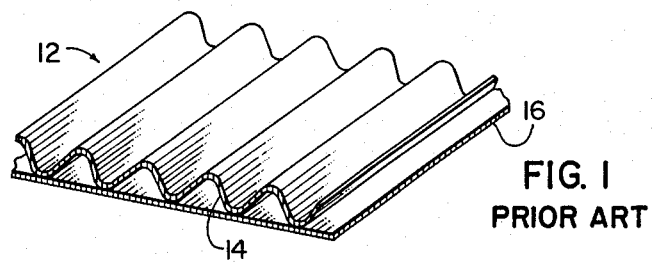
FIG. 1 illustrates a conventional protective kraft paper skin for use in a heat insulating panel.

Referring now to the drawings, there is shown in FIG. 1 a protective skin 12 used in forming a conventional composite heat insulating board or panel in accordance with the present invention. The protective skin 12 comprises a single faced corrugated kraft paper board structure having a corrugated paper board medium 14 and an outer liner 16 adhered to the crest portions of the corrugated medium with a suitable adhesive, such as for example a wet strength adhesive.

Figure 2:
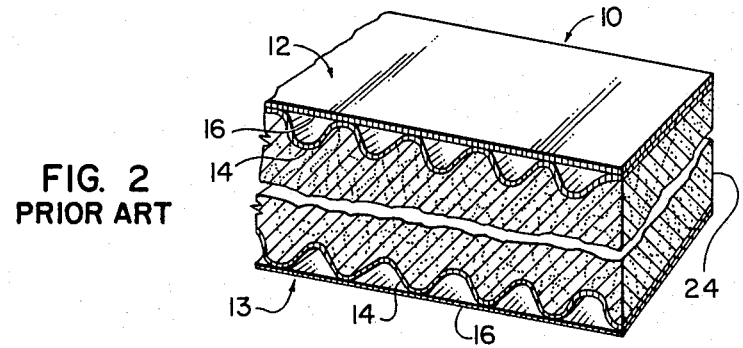
FIG. 2 illustrates a conventional heat insulating panel utilizing the protective skin of FIG. 1.

There is shown in FIG. 2 a conventional heat insulating panel 10 which utilizes the protective skin 12. The panel 10 comprises upper and lower protective skins 12, 13 having a core 24 of phenolic foam material therebetween, which is dimensionally sensitive to moisture, heat and aging.

As discussed above, the foam tends to shrink after manufacture and eventually reaches an equilibrium between the shrinkage forces and the restraining forces of the skins. It will be apparent that the corrugated structure has considerably more stiffness in the direction longitudinally of the corrugations than it does across the corrugations. This means that the shrinkage is significantly larger across the corrugations—i.e. in the "machine" direction—than it is in the "cross-machine" direction.

Figure 3:
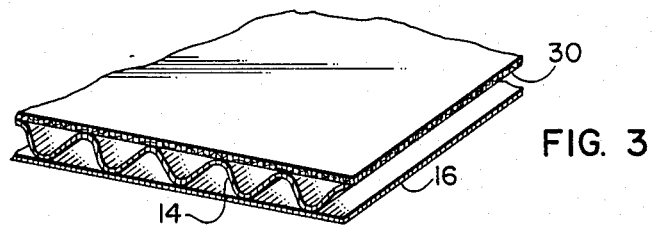
FIG. 3 illustrates a protective skin as shown in FIG. 3, provided with a mat of reinforcement material in accordance with one embodiment of the present invention.

In the embodiment of the invention illustrated by FIG. 3, in order to provide reinforcement in both directions—and thus provide uniformity of restraint to the shrinkage of the foam—a mat of porous reinforcement material 30 is provided across the apices or tips of the corrugations 14 and is secured thereto by adhesive. The mat 30 may be in the form of fibreglass or the like, in which case a typical thickness of the mat would be about 1 mm.

Figure 5:
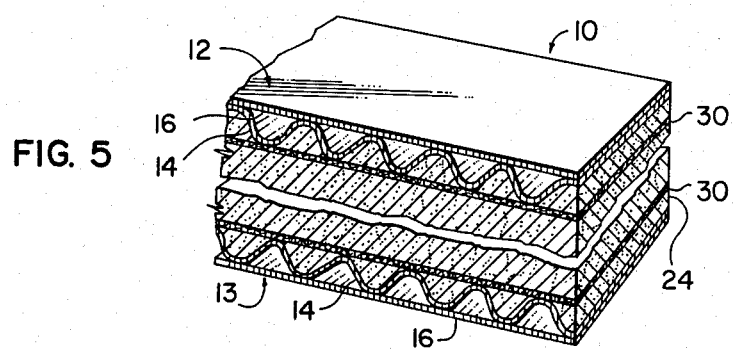
FIG. 5 is a sectional view of a composite employing the reinforcement mat shown in FIG. 3.

During the manufacturing process, the phenolic foam 24 is sandwiched between the skins 12 and 13—which have the mats 30 applied thereto—and is cured. The raising phenolic foam is forced through the pores of the mats 30 and fills the corrugations 14—thus not only assuring the bond between the consecutive layers of foam 24, mats 30 and corrugated skins 12 and 13 but also encapsulating the material of the mats 30. Thus, each resin-impregnated mat 30 provides a region of reinforcement across the tips of the corrugations 14, which greatly increases the restraining forces against shrinkage of the foam and ensures that any shrinkage which does take place is substantially uniform in the machine and cross-machine directions of the panel. The resulting structure, with the foam filling the corrugations 14, may clearly be seen in sectional view in FIG. 5.

Figure 4:
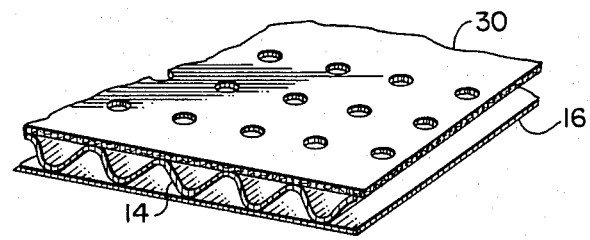
FIG. 4 is a view similar to that of FIG. 3 but illustrating a further embodiment of the invention.

FIG. 4 illustrates a further embodiment of the invention, wherein through-holes 32 are provided in the mats 30. The through-holes facilitate communication between the phenolic foam and the corrugations 14 and allow the foam to pass through the holes 32 to fill the corrugations and thereby enhance the adhesion and reinforcement properties discussed above.

All foam composites are vulnerable to delamination during use—especially where they are subjected to rough handling, cutting, traffic, etc. Such products are especially vulnerable to delamination caused by cutting, by the sticky wheels of asphalt spreaders or by sticky boots—to all of which conditions the products are subjected in the normal course of roof construction. Resistance to delamination of the composite can be increased by provision of through holes, as in FIG. 4, but modified to create, during formation of the holes, vertical regions of adhesion within the foam core. These regions are provided by formations 34, shown in FIG. 6. As may be seen, they are conical and surround the holes 32. Conveniently, they are formed from the material displaced by punching out the holes 32, as will hereinafter be described. The formations 34 comprise rings of vertical angled fibres formed around the holes 32. the formations are not limited to a conical shape but may be, for example, pyramidal, oval, triangular, etc.—depending upon the shape of punch used to form the holes. The formations 34 are typically formed in a grid pattern of 1.5"×1.5" and they project up to 0.5" into the foam core to provide a three-dimensional matrix of bonding which enhances adhesion between the foam and the mat. Thus, there is significant improvement in the resistance to delamination of the composite—especially peeling and delamination of skins (facers) used on phenolic foam cores for roof insulation.

Figure 7:
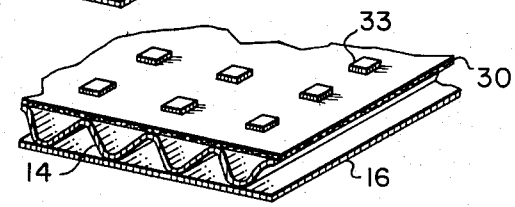

FIG. 7 illustrates a further embodiment of the invention, wherein anchor points 33 are provided upon the mat 30. These may be in the form of small pieces of cellulosic felt or Velcro (trade mark) glued to the continuous mat 30. Alternatively, the anchor pieces may be formed from perforated bead board, pieces of cured closed cell phenolic foam or spots of adhesive such as epoxy or catalysed resin. In all of the foregoing, the purpose of the anchor points is to provide locally increased adhesion between the phenolic foam core 24 and the mat 30 and thus further improve the tensile strength of the composite.

Figure 8:
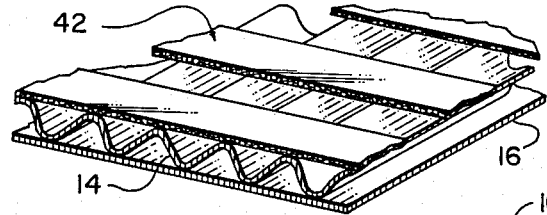
Figure 9:
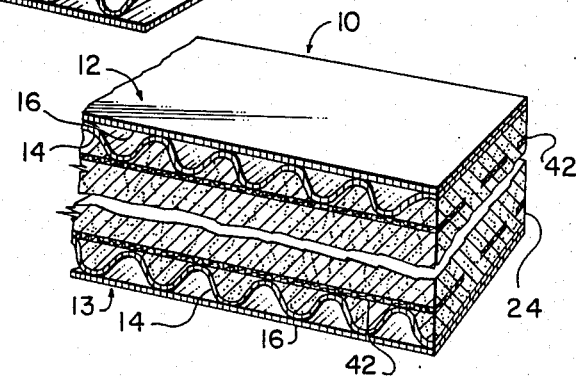
FIG. 9 is a sectional view of a composite employing the reinforcement strips shown in FIG. 8.

FIG. 8 illustrates yet a further embodiment of the invention wherein, instead of a continuous mat 30, strips 42 are employed, these being laid across the tips of the corrugations 14. As may clearly be seen from FIG. 9, the resulting composite has the strips 42 embedded in the foam core 24, by encapsulating the strips as the foam rises and fills the corrugations.

Thus, it will be appreciated that the essence of the invention lies in the ability of the foam to fill the corrugations 14 and also encapsulate the reinforcement medium. Thus, if the medium is continuous,—as in the embodiment of FIG. 3—then it must be porous to enable passage of the foam therethrough. However, if it is discontinuous in the sense of having through-holes (FIGS. 4 and 6) or is in the form of strips (FIG. 8), the medium need not be porous since the foam has unimpeded access to the corrugations.

FIGS. 10 and 10a show, in schematic form, part of a production line for manufacturing foam composites according to the invention. First and second runs of kraft paper 12, 13 are separately fed into a forming means comprising a pair of belt conveyors 100,200, which are spaced apart by the desired thickness of the composite to be manufactured. Each kraft paper run has a continuous or apertured mat 30 of reinforcement material applied across the corrugations thereof in a previous stage (not shown) and the layers 30 face each other as they approach the gap between belts 100,200. Thus, in cross-section, the kraft paper runs (which will form the skins 12 and 13) are as shown in FIG. 3 or 4. Alternatively, each kraft paper run may have the strips of FIG. 8 applied across the corrugations in a previous stage.

As an alternative to pre-applying the mats or strips to the skins 12, 13, they may be fed separately in the manner illustrated by FIG. 11.

Foam precursor 24 is introduced into the lower kraft paper run 13 from a dispenser 300 and as the lower run transports the foam into the region between the belts 100, 200, the foam is partially compressed and forced through the sheet 30 or strips 42 to fill the corrugations of the kraft paper. From the belt conveyors 100, 200, the composite passes into a heating tunnel 400, wherein controlled foaming and curing takes place. Of course, the apparatus illustrated in FIG. 10 is entirely conventional and the invention is thus adaptable to existing production lines with minimal modifications required.

FIGS. 11 and 11a illustrate a modification of the production method illustrated by FIG. 10, wherein means are provided for forming the through holes 32 and conical formations 34. The top run of fibreglass mat 30 is fed to the foam 24 separately from the kraft paper run 12 and is led around a foaming roller 134. The roller 134 is provided with suitably spaced, conical punches 234 projecting from the roller surface. As the fibreglass mat passes around the forming roller, the conical punches perforate the mat and due to the "memory" of the glass fibres which are displaced into a conical ring of fibres around each hole, the displaced fibres retain their shape during subsequent processing. From the forming roller 134, the perforated mat is laid onto the uncured foaming mixture 24 with the conical rings of fibres extending downwardly into the wet, uncured foam and, thereafter, the kraft paper skin 12 is laid down onto the fibreglass mat. The composite so-formed is then transported to the heating tunnel 400.

FIGS. 12 and 12a illustrate the situation where both the top and bottom skins 12 and 13 have fibreglass reinforcement mats which are fed separately from the kraft paper runs and are led around forming rollers 134.

The precise pattern, size and shape of the projections 34 may be varied to provide optimum delamination resistance for specific situations. In practice, we have found that rounded conical punches produce the most effective results (see FIG. 13). The relatively blunt edges of the punches were found to displace the fibres to an adequate height from the mat surface and also over a relatively wide area. Sharp, conical punches were found to result in adequate vertical displacement but lower area coverage. Other shapes demonstrated significantly inferior results. Thus, it is believed that best results are likely to be derived from use of conical or rounded punches which break apart the fibreglass matrix and displace the fibres rather than clearly cutting through the mat.

The embodiments of the invention in which an exclusive property or privilege is claimed are defined as follows:

1. In a foam composite comprising first and second opposed corrugated skins having corrugations with inwardly facing apices and a core of foam material between the opposed inwardly facing surfaces of said skins, the improvement wherein one or each of said skins is provided with a mat of porous or apertured reinforcement material extending across the apices of said corrugations and said foam extends through the pores or apertures of each said mat to fill the spaces defined by the inwardly facing surfaces of said corrugations and embed said reinforcement material within said foam.

2. In a foam composite comprising first and second opposed corrugated skins having corrugations with inwardly facing apices and a core of foam material between the opposed inwardly facing surfaces of said skins, the improvement wherein one or each of said skins is provided with a plurality of strips of rigid reinforcement material, spaced apart and extending across the apices of said corrugations, and said foam extends through the gaps between said strips to fill the spaces defined by the inwardly facing surfaces of said corrugations and embed said strips of reinforcement material within said foam.

3. A foam composite as defined in claim 1 wherein said reinforcement material is fibreglass.

4. A foam composite as defined in claim 2 wherein said reinforcement material is selected from fibreglass, steel strapping, cellulosic felt, gypsum paper and extruded polymer profile.

5. A foam composite as defined in claim 1 or claim 3 wherein the or each said mat is provided with a plurality of through-holes through which said foam extends.

6. A foam composite as defined in claim 1 or claim 3, wherein said corrugated skins are kraft paper.

7. A foam composite as defined in claim 2 or claim 4, wherein said corrugated skins are kraft paper.

8. A foam composite as defined in claim 1 or claim 3, wherein the or each said mat is provided with a plurality of through-holes through which said foam extends and each said through hole is surrounded by a ring of fibres displaced from said mat during formation of said through-holes and extending into said foam.

9. A foam composite as defined in claim 1 or claim 3, wherein the or each said mat is provided with a plurality of through-holes through which said foam extends and each said through-hole is surrounded by a conically tapering ring of fibres displaced from said mat during formation of said through-holes and extending into said foam.

10. A foam composite as defined in claim 1 or claim 3, wherein the or each said mat is provided with a plurality of anchor points secured to said mat on its surface adjacent said foam core and providing locally increased adhesion between said foam and said mat.

11. A foam composite as defined in claim 1 or claim 3, wherein the or each said mat is provided with a plurality of anchor points in the form of pieces of cellulosic felt, Velcro, bead board, or phenolic foam, or spots of epoxy or catalysed resin adhesive, secured to said mat on its surface adjacent said foam core and providing locally increased adhesion between said foam and said mat.

12. A foam composite as defined in claim 1 or claim 2, wherein said foam is selected from closed-celled or open-celled phenolic foam, urethane and isocyanurate foams.

13. A foam composite as defined in claim 1 or claim 2, wherein said foam is a closed-cell phenolic foam.

14. A closed cell phenolic foam composite as defined in claim 1 or claim 3 wherein the or each said mat is provided with a plurality of through-holes through which said foam extends.

15. A closed cell phenolic foam composite as defined in claim 1 or claim 3, wherein said corrugated skins are kraft paper.

16. A closed cell phenolic foam composite as defined in claim 2 or claim 4, wherein said corrugated skins are kraft paper.

17. A closed cell phenolic foam composite as defined in claim 1 or claim 3, wherein the or each said mat is provided with a plurality of through-holes through which said foam extends and each said through hole is surrounded by a ring of fibres displaced from said mat during formation of said through-holes and extending into said foam.

18. A closed cell phenolic foam composite as defined in claim 1 or claim 3, wherein the or each said mat is provided with a plurality of through-holes through which said foam extends and each said through-hole is surrounded by a conically tapering ring of fibres displaced from said mat during formation of said through-holes and extending into said foam.

19. A closed cell phenolic foam composite as defined in claim 1 or claim 3, wherein the or each said mat is provided with a plurality of anchor points secured to said mat on its surface adjacent said foam core and providing locally increased adhesion between said foam and said mat.

20. A closed cell pheolic foam composite as defined in claim 1 or claim 3, wherein the or each said mat is provided with a plurality of anchor points in the form of pieces of cellulosic felt, Velcro, perforated bead board, or cured closed cell phenolic foam, or spots of epoxy or catalysed resin adhesive, secured to said mat on its surface adjacent said foam core and providing locally increased adhesion between said foam and said mat.

21. In a method of manufacturing a foam composite comprising first and second opposed corrugated skins having corrugations with inwardly facing apices and a core of closed cell phenolic foam material between the opposed inwardly facing surfaces of said skins, the improvement comprising applying to one or each of said skins a mat of reinforcement material whereby said mat extends across the apices of said skin, and applying uncured foaming mixture between said skins prior to transporting the sandwich comprising said skins, said foam and said reinforcement mat or mats through forming means for said composite.

22. The method of claim 21, wherein means are provided for puncturing said mat or mats to form a plurality of through-holes therein prior to application thereof to the or each said skin.

23. The method of claim 22, wherein said through-holes are punched out cleanly from the or each said mat.

24. The method of claim 22, wheein said through-holes are punched out to leave a ring of mat material around each said hole, each said ring extending inwardly from the surface of said mat and into the subsequently formed foam core.

25. The method of claim 24, wherein said through-holes are punched out by means of a roller around which the mat is caused to pass, said roller having punches extending therefrom in the form of projections which perforate the mat passing therearound.

26. The method of claim 24 or 25, wherein said through-holes are punched out by means of rounded conical punches which break apart the matrix of the mat and deform the material into a conical ring around each hole.

27. In a method of manufacturing a closed cell phenolic foam composite comprising first and second opposed corrugated skins having corrugations with inwardly facing apices and a core of closed cell phenolic foam material between the opposed inwardly facing surfaces of said skins, the improvement comprising applying to one or each of said skins a plurality of strips of rigid reinforcement material, spaced apart and extending across the apices of said corrugations, and applying uncured foaming mixture between said skins prior to transporting the sandwich comprising said skins, said foam and said reinforcement mat or mats through forming means for said composite.

* * * * *